UNITED STATES PATENT OFFICE.

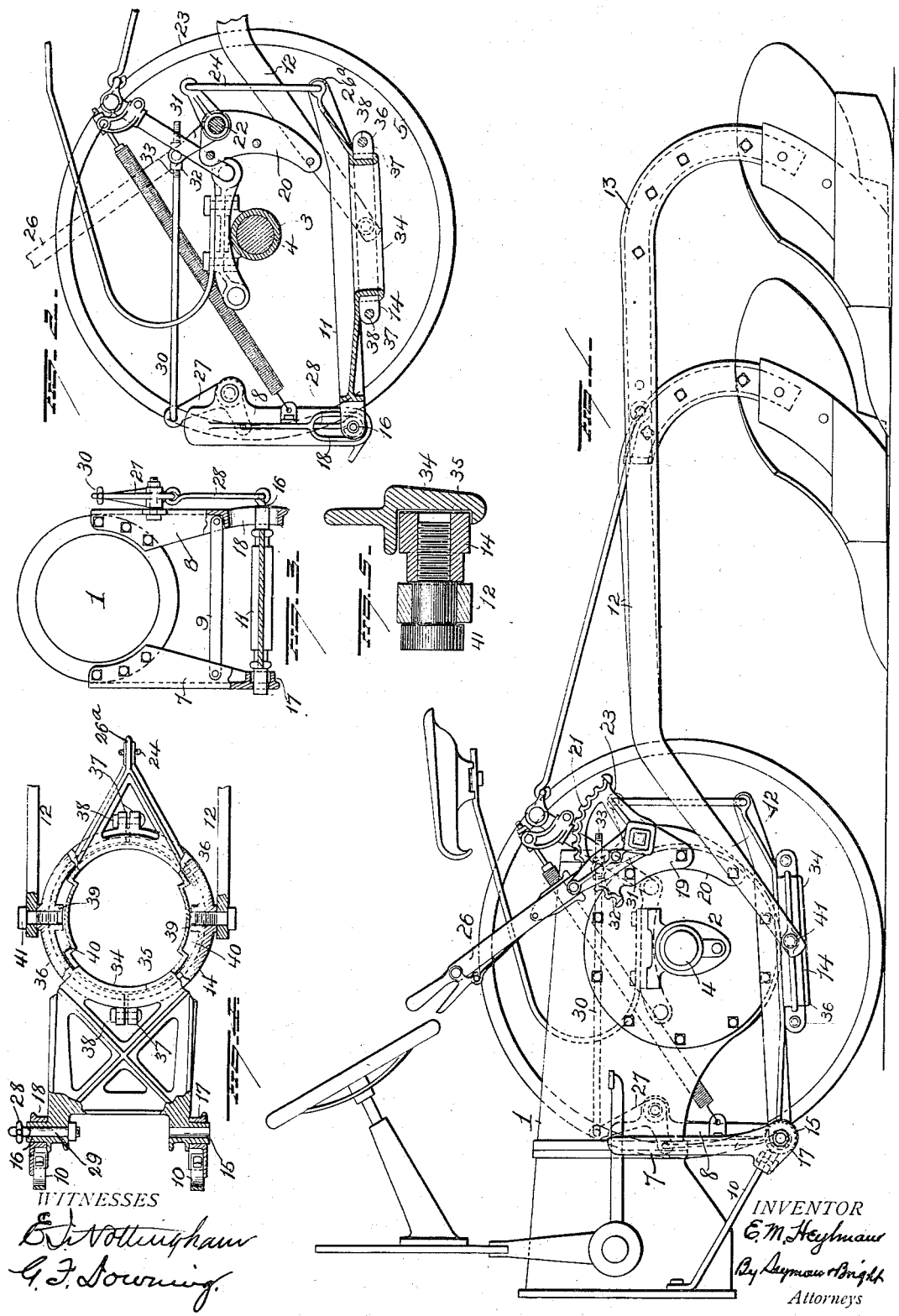

EDWARD M. HEYLMAN, OF SOUTH BEND, INDIANA, ASSIGNOR TO OLIVER CHILLED PLOW WORKS, OF SOUTH BEND, INDIANA.

PLOW.

1,285,171.      Specification of Letters Patent.      Patented Nov. 19, 1918.

Original application filed January 16, 1917, Serial No. 142,677. (Patent No. 1,262,949, dated April 16, 1918.)
Divided and this application filed June 8, 1917. Serial No. 173,608.

*To all whom it may concern:*

Be it known that I, EDWARD M. HEYLMAN, a citizen of the United States, and a resident of South Bend, in the county of St. Joseph and State of Indiana, have invented certain new and useful Improvements in Plows; and I do hereby declare the following to be a full, clear, and exact description of the invention, such as will enable others skilled in the art to which it appertains to make and use the same.

This invention relates to improvements in plows and more particularly to such as are associated with a tractor and known in the art as engine gang plows,—this application being a division of application filed by me on the 16th day of January, 1917, and designated by Serial No. 142,677, now Patent No. 1,262,949, dated Apr. 16, 1918.

One object of my present invention is to provide simple and efficient means which will facilitate the turning of the plow without removing the same from the ground.

A further object is to so construct and arrange the connections between the plow and the tractor that the plow will, while in the ground, properly trail when the tractor is turned or run in a curved direction, without imparting lateral strain to such connections or to the tractor.

A further object is to so connect the plow with the tractor that a pivotal connection having a vertical axis will be afforded approximately under the rear axle of the tractor.

A further object is to provide a draft device between the plow and tractor, embodying a horizontally disposed turn-table disposed approximately under the rear axle of the tractor and with which the plow is pivotally connected.

A further object is to so construct a draft device between a plow and a tractor, that both horizontal and vertical pivotal connections shall be afforded for the plow approximately under the rear axle of the tractor.

With these and other objects in view, the invention consists in certain novel features of construction and combinations of parts as hereinafter set forth and pointed out in the claims.

In the accompanying drawings, Figure 1 is a side elevation of an engine gang plow structure embodying my improvements; Fig. 2 is a side elevation (partly in section); Fig. 3 is an end view partly in section showing the connections of the draft bail with the tractor and portions of the adjusting mechanism; Fig. 4 is a plan view, partly in section showing means for connecting the same with the tractor and with the plow beams, and Fig. 5 is an enlarged detail sectional view.

1 represents the rear portion of a tractor, to which the casings 2—3 are secured for inclosing portions of the driving gearing (not shown) and for providing mountings for the axle 4 to which the rear tractor wheels 5 are connected.

Brackets 7 and 8 are secured to the frame of the tractor forwardly of the axle and depend from said frame, said brackets being spaced apart as shown in Fig. 3 and connected by a brace bar 9. Braces 10 are secured to the lower ends of the brackets and to the tractor forwardly of said brackets, as shown in Fig. 1.

The forward end of a draft bail 11 is pivotally connected with the depending brackets 7, 8 and projects therefrom rearwardly under the rear axle of the tractor to receive the beam members 12, 12 of a plow gang 13,—the connection of said beams with the bail being effected through the medium of a turntable 14 carried by the bail approximately under the rear axle of the tractor.

In effecting the pivotal connection of the forward end the bail 11 with the brackets 7, 8, the bail is provided with lateral pintles 15, 16 to enter openings 17, 18 in the lower portions of the brackets 7, 8. The opening 17 in which the pintle 15 has its bearing at the lower end of the bracket 7 may be circular and of such size that the pintle 15 shall fit loosely therein, while the opening 18 into which the pintle 16 enters, is made in the form of an elongated slot, and the lower portion of the bracket 8 is curved somewhat so that the slot therein shall be segmental in form. From this construction, it will be apparent that the bail may be tilted in such manner as to permit the leveling of the plow gang connected therewith.

Brackets 19, 20 are secured to the mounting of the rear axle and approximately central between the rear wheels,—the bracket 19 being formed at its upper end with a toothed segment 21, as shown in Fig. 1. A shaft 22 is mounted in the brackets 19 and 20 and provided with a rearwardly projecting arm 23 connected, by means of a rod 24, with the V-shaped rear end 26ª of the draft bail 11. A hand lever 26 is secured to the shaft 22 and provided with a suitable detent to engage the toothed segment 21. By operating the lever 26, the draft bail may be moved vertically and the plow gang thus adjusted for depth of plowing.

A bell crank lever 27 is pivotally mounted on the bracket 8 and the lower arm of this bell crank is connected with the vertically movable pintle 16 at the forward right hand corner of the bail by means of a rod 28. In effecting such connection, a bolt 29 is mounted in the tubular pintle 16 (Fig. 4) and provided at its outer end with an eye to receive a similar eye at the lower end of the rod 28. The upper arm of the bell crank 27 is connected, by means of a rod 30 with an arm 31 projecting upwardly from the shaft 22. In effecting the connection between the rod 30 and arm 31, an interiorly threaded sleeve 32 is pivotally mounted on the arm 31 for the passage of the threaded portion 33 of said rod, thus providing an adjustable connection between the rod and arm. With such construction, the operation of the lever 26 to adjust the plows for depth of plowing, will also cause one side of the draft bail to be raised and in this manner the plows may be leveled and adjusted for depth of plowing, simultaneously with the use of a single operating lever.

The draft bail 11 is provided intermediate of its ends with a circular portion 34 having an annular groove 35 in which the turntable 14 is mounted. The turntable may be conveniently made in two semi-circular sections 36—36, provided at their ends with lugs 37 through which securing bolts 38 are passed. The respective sections of the turntable are provided intermediate of their ends with interiorly threaded bosses 39 and the inner ends of these bosses enter grooves 40 formed in the periphery of the circular mounting 34 to serve as limit stops for the turntable. Headed studs 41 are screwed into the bosses 39 and to the projecting ends of these studs, the forward ends of the beam members 12 of the plow gang are pivotally connected.

It will be observed that with the construction and arrangement of parts as hereinbefore described, the plow is connected with a pivoted draft bail in such manner that two pivotal connections of said plow with the bail are effected under the rear axle of the tractor, and that said pivotal connections are disposed at right angles to each other, the turntable affording a pivotal connection having a vertical axis permitting lateral movement of the plow relatively to the tractor, and the attachment of the beam members 12 with the turntable affording a pivotal connection having a horizontal axis permitting the plow to be raised. With such connection of the plow with the bail under the rear axle of the tractor, uniformity of depth of plowing will be enhanced and the proper trailing of the plow behind the tractor when a turn is made with the plow bases in the ground, will be insured without subjecting the tractor or the plow and its connections with the tractor, to lateral strains.

Various changes might be made in the details of construction of my invention without departing from the spirit thereof or limiting its scope, and hence I do not wish to restrict myself to the precise details herein set forth.

Having fully described my invention what I claim as new and desire to secure by Letters-Patent, is:—

1. An engine plow structure, comprising a tractor, a draft device connected with the tractor, and a plow having two pivotal connections with the draft device, said pivotal connections being disposed at right angles to each other and located approximately under the rear axle of the tractor.

2. An engine gang plow structure comprising a tractor, a draft bail connected therewith, a horizontal member supported by the draft bail and adapted to turn, said horizontal member being disposed between the connection of the forward portion of the bail with the tractor and the rear portion of said bail, and a plow having pivotal connection with said horizontal member at right angles to the axis of the latter.

3. An engine gang plow structure comprising a tractor, a draft bail connected therewith, a turntable mounted on said bail, said turntable being disposed between the connection of the forward portion of the bail with the tractor and the rear portion of said bail, and a plow having pivotal connection with the turntable at diametrically opposite points thereon.

4. An engine plow structure, comprising a tractor, a draft bail connected with said tractor forwardly of its rear axle, and a plow having vertical and horizontal pivotal connection with said draft bail approximately under said rear axle.

5. An engine plow structure, comprising a tractor, a draft bail connected with the tractor forwardly of its rear axle, a horizontally disposed turntable carried by said bail approximately under the rear axle of the tractor, and a plow pivotally connected with said turntable.

6. In an engine plow structure, the combination with a tractor, of a draft bail connected therewith, said draft bail having a circular portion between its ends, an annular turntable mounted on said circular portion of the draft bail, a plow pivotally connected with said turntable, and means for limiting the turning movement of said turntable.

7. In an engine plow structure, the combination with a tractor, of a draft bail connected therewith, a plow, means providing two pivotal connections at right angles to each other between the plow and the draft bail and approximately under the rear axle of the tractor, and supporting means connecting the rear end of the draft bail with the tractor.

In testimony whereof, I have signed this specification in the presence of two subscribing witnesses.

EDWARD M. HEYLMAN.

Witnesses:
 EDWIN NICAR,
 CHARLES A. WEBSTER.